July 22, 1930.   N. B. HAFLEIGH   1,771,295
BONE DE-KNUCKLING MACHINE
Filed March 2, 1929   2 Sheets-Sheet 1

Inventor.—
Norman B. Hafleigh
by his Attorneys - Howson + Howson

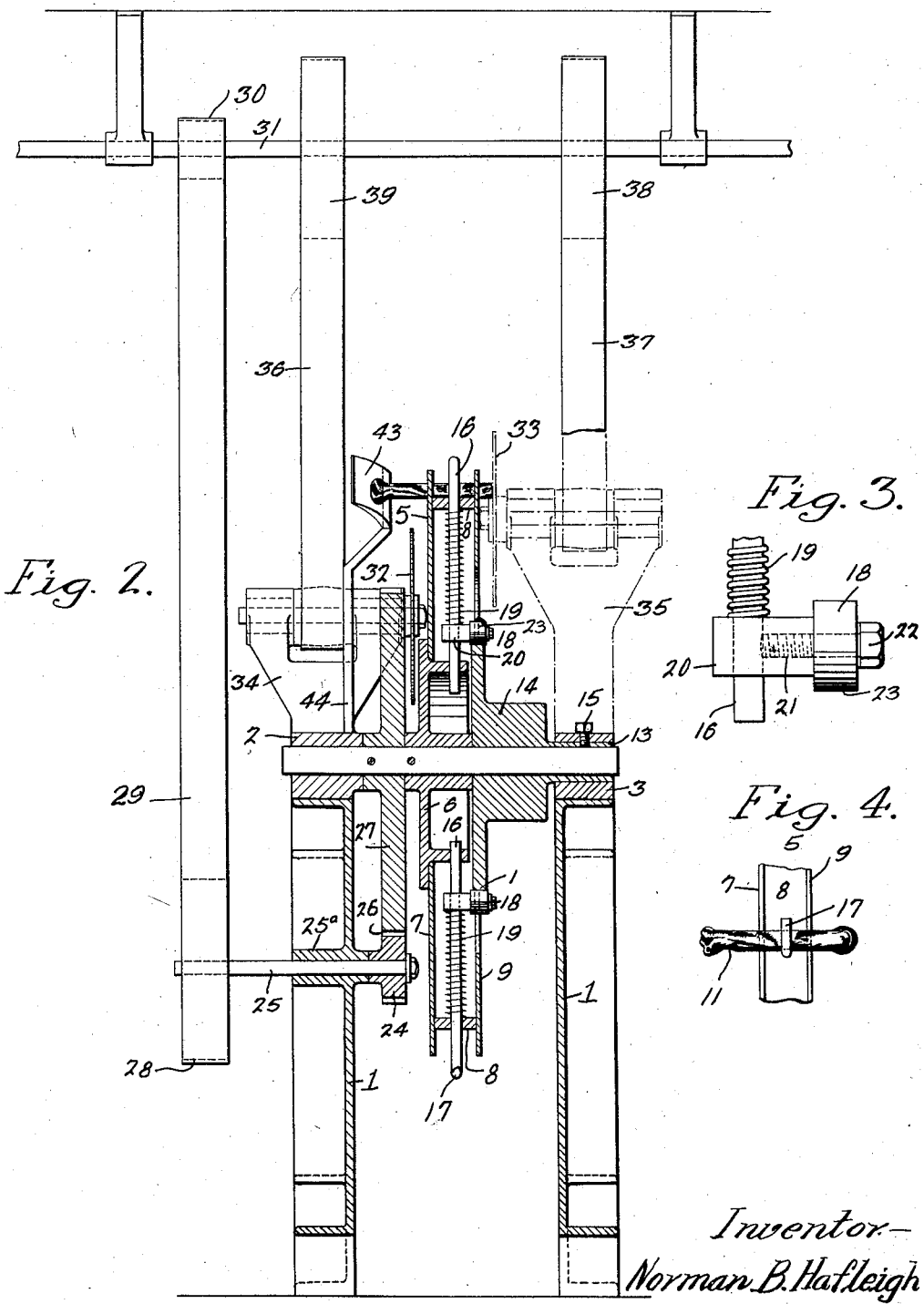

Patented July 22, 1930

1,771,295

UNITED STATES PATENT OFFICE

NORMAN B. HAFLEIGH, OF PHILADELPHIA, PENNSYLVANIA

BONE-DEKNUCKLING MACHINE

Application filed March 2, 1929. Serial No. 343,891.

This invention relates to certain new and useful improvements in apparatus for removing the knuckles from bones which are eventually used in making buttons and similar articles.

One of the objects of my present invention is to provide a machine which will remove the knuckle ends of bones, so that there will be no waste of the body portions, which are to be used in the manufacture of buttons and like objects.

Another object is to saw off the two knuckles from bones through one setting by the operator.

A further object is to provide means for clamping the bone in a carrier, which will carry the bone past a saw to remove one knuckle, for then moving it longitudinally to properly position the remaining knuckle, and for then reclamping the bone and moving it past another saw, to remove the other knuckle, regardless of the length of the bone.

The invention also relates to details which will be described hereinafter.

In the drawings, in which is illustrated one exemplification of my invention;

Fig. 2 is a transverse sectional view through Fig. 1; parts being shown in skeleton outline;

Fig. 3 is a detail of one of the followers of the clamp-actuating cam; while

Fig. 4 is a detail showing a bone clamped to the carrier.

Figure 1:
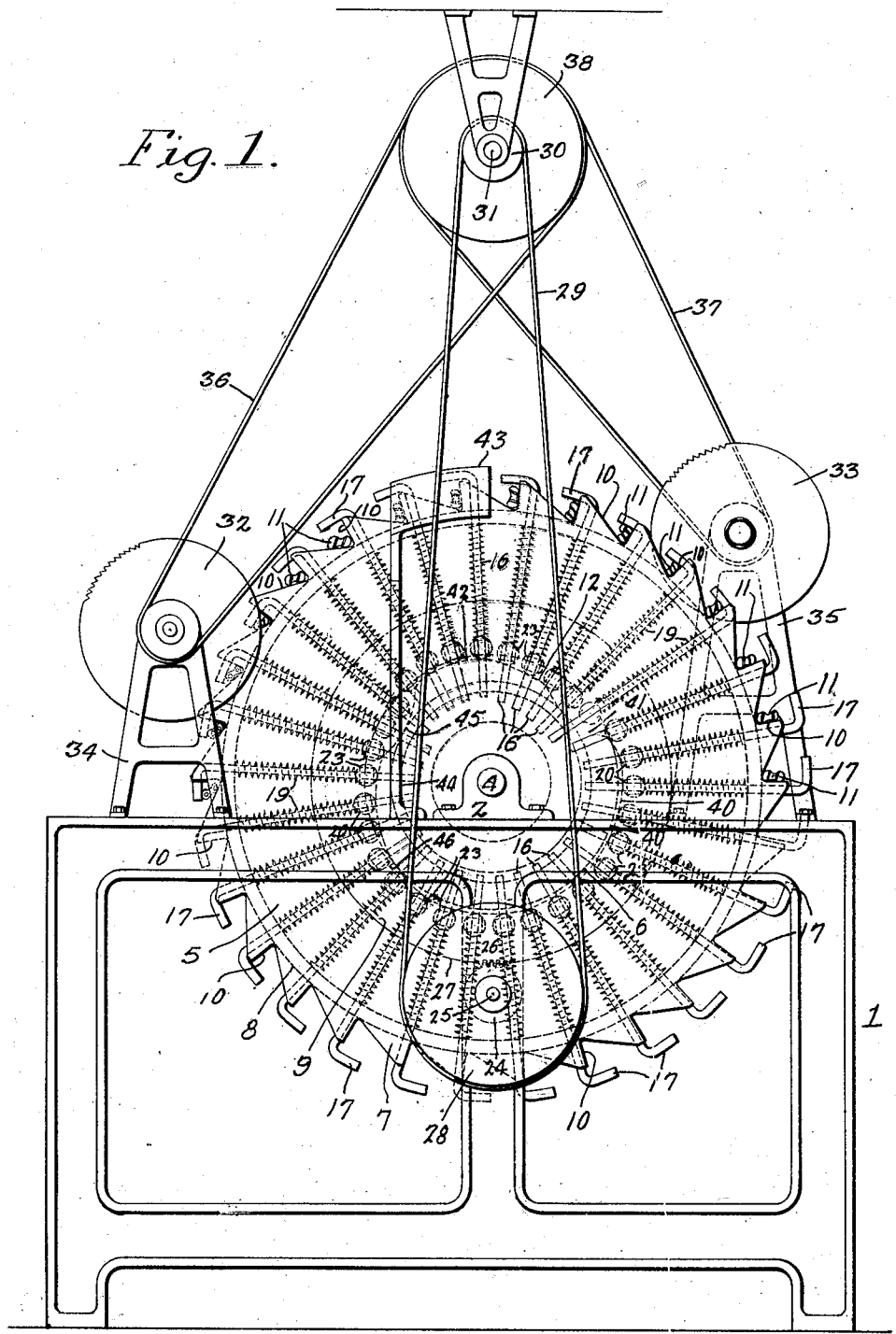
Fig. 1 is a side view.

At 1 is shown a frame of conventional design having bearings 2 and 3, carrying a shaft 4. A carrier 5 is mounted for rotation on the shaft, and comprises a spider 6 to which is attached an annular plate 7. Adjacent the periphery of the plate 7 an annular ring 8, extending at right angles thereto, acts as a connection to another annular plate 9. Each plate 7 and 9 is provided on its periphery with a plurality of saw-tooth edges 10 into which bones 11 are fed by an operator.

A stationary plate cam 12 is loosely mounted on the shaft 4, and preferably has a shank 13 extending rearwardly from the hub 14. This shank is internally bored and surrounds the shaft 4, being secured in fixed relation to the frame 1 by means such as a set screw 15 extending through the bearing 3. A plurality of radially extending clamping arms 16 are fixed in the spider 6, extending outwardly between plates 7 and 9 in such manner that their ends 17, bent approximately at right angles to the main portions of the arms, are enabled to clamp the bones 11 in the saw-teeth depressions 10.

Cam followers 18 fixed to the arms 16 rest on the cam 12 and act to guide the arms radially to clamp or release the bones according to the surface contours of the cam. The arms are preferably normally urged inwardly by means such as springs 19, coiled about the arms 16 and abutting at one end the carrier 5 at the ring 8, and the cam follower 18 at the other end. The cam follower will be seen to comprise in the present instance a member 20 extending outwardly from the arm 16, and having a longitudinal bore 21, through which a bolt 22 passes, acting both as a set screw, and to secure an anti-friction cam-follower 23 to the member 20. It is of course intended that this structure can be varied within reasonable limits without departing from the spirit of the invention.

The carrier may be rotated by suitable means such as a pinion 24 on a shaft 25, and meshing with the teeth 26 of a gear 27 fixed to the shaft 4. The shaft 25 may have a bearing 25$^a$ in the frame 1 and preferably terminates in a pulley 28 driven by a belt 29 from a pulley 30 on a drive shaft 31. Geared in such manner as to operate at high speeds, disc saws 32 and 33 are mounted on diagonally opposite sides of the frame 1, on auxiliary frames 34 and 35. These saws are rotated by belts 36 and 37 from large diameter pulleys 38 and 39 on the shaft 31.

The action of the cam 12 is such that at the right-hand side of Fig. 1 the surface 40 thereof forces the clamp arms 16 outwardly against the tension of the springs 19, so that the operator can feed the bones 11, with the knuckles in their proper position, into the saw teeth 10. The cavity 41 then permits the clamps to be urged inwardly by the springs 19 to clamp the bones as they pass by the saw 33, which severs the knuckle adjacent thereto. The clamps are then released by the elevation 42 in the cam surface, to release the bones.

Advantage is now taken of the fact that the knuckles of similar types of bones from the same species of animal, regardless of the size or length of the individual bones, are approximately the same length. A cam 43, so shaped as to engage the extremities of the bones and to guide them inwardly to a distance from the outer edge of the plate 7 but little greater than the length of a knuckle, is mounted on a support 44 extending upwardly from the top of the frame 1.

After the bones have been so positioned, the valley 45 of cam 12 permits the clamps to grip the bones during the time that the remaining knuckle is being severed during its passage past the saw 32, the clamps then being actuated by the elevated portion 46 to release the de-knuckled bones so that they can drop into a suitable receptacle. The operation will be obvious from the foregoing.

It is of course understood that the invention is susceptible to numerous modifications and adaptations, and it is intended that it be limited only by the scope of the appended claims.

I claim:

1. The combination in a bone de-knuckling machine of saws, means for carrying the bones past one saw to remove one knuckle, and means for moving the bones longitudinally to position them so that said first mentioned means are enabled to carry them past another saw to remove the opposite knuckle.

2. In a bone de-knuckling machine, a rotatable carrier, a plurality of saws operatively associated with and circumferentially spaced about said carrier, releasable clamps for securing bones to said carrier as they pass under one of said saws, means for releasing said clamps thereafter, means for urging said bones longitudinally, and means for actuating said clamps to again secure said bones as they pass under another of said saws, and for releasing the bones thereafter.

3. The combination of a rotary carrier, a series of clamps, a cam for actuating the clamps, and two saws, one set in advance of the other, said saws being on opposite sides of the carrier, the clamps holding bones while passing the first saw and releasing them between the first and second saw, and then again clamping them as they pass the second saw and means longitudinally shifting the bones when released by the clamping means.

4. The combination in a bone de-knuckling machine, of saws, a rotatable carrier for bones, radially extending clamps on said carrier, means for actuating said clamps to grip bones fed thereto, as they pass one of said saws to remove a knuckle therefrom, and to release the clamps thereafter, and a cam for urging said bones longitudinally after they have been released, to position them in alignment with another of said saws, said clamp-actuating means then operating to clamp the bones as they pass said second mentioned saw, to remove the other knuckle.

5. The combination in a bone de-knuckling machine of a carrier, means for rotating said carrier, clamps on the carrier, a pair of saws circumferentially spaced about the carrier, means for actuating said clamps to clamp a bone on the carrier to hold it while passing one saw, and to release it thereafter, and means for moving the bone longitudinally to space the outer extremity of the other knuckle from another saw a distance equal to the length of the knuckle, said actuating means then causing the clamps to hold the bone as it passes said last mentioned saw, and to release it after the last mentioned knuckle has been severed from the bone.

6. The combination in a bone de-knuckling machine, of a carrier, clamps on the carrier, two saws, one located in advance of the other and on opposite sides of the carrier, means for actuating said clamp to secure a bone on the carrier and to hold it while passing one saw, and to then release the bone after it passes the first saw, and means for moving the bone longitudinally to place the other knuckle in the path of the other saw, said means again actuating the clamps to secure the bone to the carrier as it passes a second saw, and to release it after two knuckles have been severed therefrom.

7. In a bone de-knuckling machine, a frame, a rotatable carrier in said frame, means for rotating said carrier, clamps for securing bones adjacent the periphery of said carrier, a fixed cam for actuating said clamps, disc saws mounted on said frame one in advance of the other and at the opposite side of the carrier therefrom, and a cam mounted on said frame and extending upwardly therefrom, between said saws, the bones being gripped by said clamps under the actuation of the first mentioned cam as they pass under the first of said saws where one knuckle is severed, and being then released, said second mentioned cam thrusting the bones longitudinally to a predetermined position, when the clamps are again actuated to secure the bones as they pass under the second of said saws, whereby the other knuckle is severed.

8. The combination in a bone de-knucking machine of means for advancing bones in a direction transverse to their length over a given path, a pair of saws arranged at opposite sides of said path and spaced longitudinally of the path, means for clamping the bones during their passage by the saws, means for releasing the clamping means intermediate the saws and means for shifting the bones longitudinally when released.

NORMAN B. HAFLEIGH.